C. H. BARNES.
FIREARM.
APPLICATION FILED SEPT. 27, 1912.

1,202,017.

Patented Oct. 24, 1916.
6 SHEETS—SHEET 1.

WITNESSES:

INVENTOR
Charles H. Barnes
BY
ATTORNEYS

UNITED STATES PATENT OFFICE.

CHARLES H. BARNES, OF ILION, NEW YORK.

FIREARM.

1,202,017.

Specification of Letters Patent.   Patented Oct. 24, 1916.

Application filed September 27, 1912. Serial No. 722,608.

*To all whom it may concern:*

Be it known that I, CHARLES H. BARNES, of Ilion, in the county of Herkimer and State of New York, have invented a certain new and useful Firearm, of which the following is a specification.

This invention relates to firearms and has for its object particularly simple frame and receiver constructions and mechanism therein; and it consists in the combinations and constructions hereinafter set forth and claimed.

In describing this invention reference is had to the accompanying drawings in which like characters designate corresponding parts in all the views.

Figure 3:
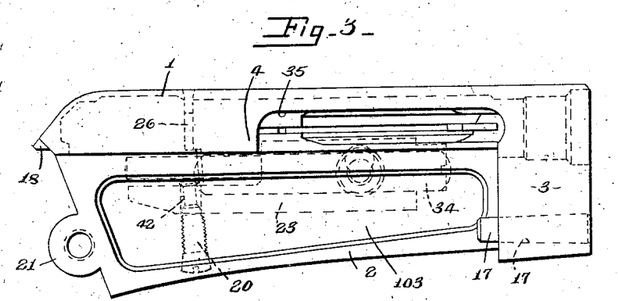
Figs. 3 and 4 are respectively a right side elevation and rear end elevation of the receiver.
Figure 4:
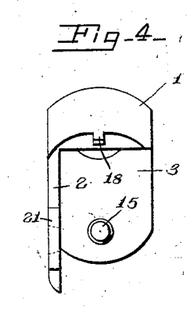

1 is the receiver which, as best seen in Figs. 3 and 4, includes a top, a side plate 2 and a block 3 at its front end, the side of the receiver opposite the side plate 2 being open, with the exception of the portion near the top which is closed by a flange 4 depending from the top. The block 3 is formed with a passage in which is detachably mounted the barrel 5 of the firearm, the barrel having the firing chamber 6 in its rear end.

Figure 1:
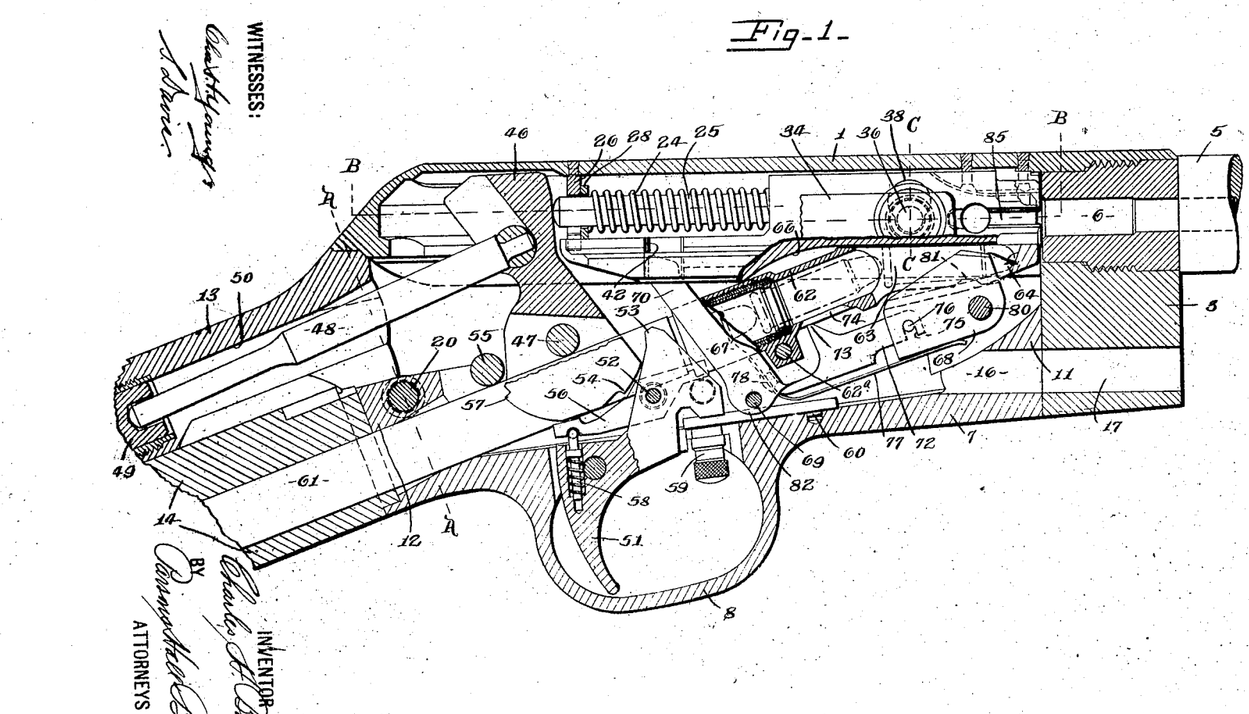
Figures 1 and 2 are longitudinal sectional views of the receiver and frame of my firearm, and mechanism contained therein, contiguous parts of the firearm being also shown, the mechanism being shown in its position occupied when the breech is closed in Fig. 1, and when the breech is open in Fig. 2.
Figure 2:
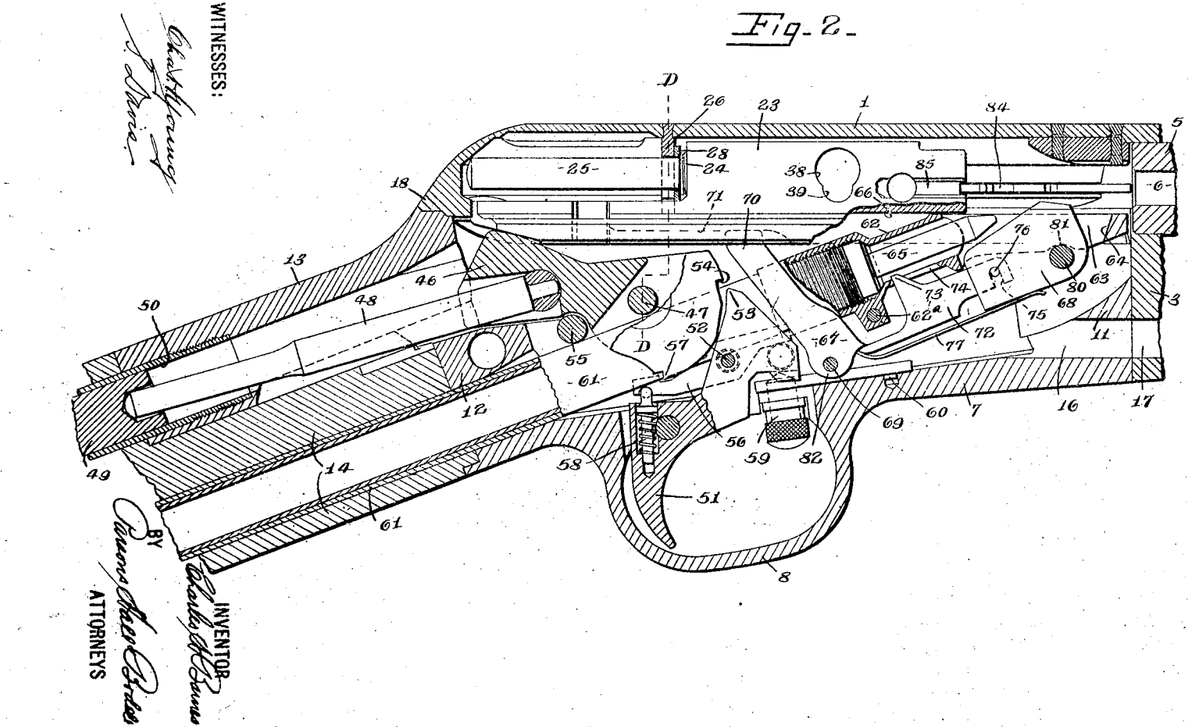

7 is the frame of the firearm, the frame comprising a bottom or trigger plate formed with a trigger guard 8, two sides 9, 10, Figs. 5, 6, 16 and 17, blocks 11, 12 at its front and rear ends, Figs. 1 and 2. The side 9 of the frame is arranged to close the open side of the receiver and meets the flange 4 and is flush with the outer face of the flange 4; and the side 10 is located in the receiver contiguous to the side plate 2, Figs. 16 and 17, and is depressed with respect to the side edge of the bottom and side face of the block 12 in order that the side plate of the receiver 1 will be flush with the exposed side faces of the frame and interfit with the frame. The frame is also formed with a rearwardly extending tank 13 to which the stock 14 is secured.

The receiver 1 and frame 7 are provided with interfitting means extending in a direction lengthwise of the frame and receiver and engaged and disengaged by relative lengthwise movement of the frame and the receiver, and a single detachable fastening member or screw for preventing said relative movement.

The interfitting means are usually located near the front and rear ends of the receiver and the means at the front end of the receiver and frame is here shown, Figs. 1, 2, 3 and 4, as a dowel pin 15 projecting rearwardly from the block 3 near the lower face thereof and a socket 16 in the block 11 at the front side of the frame, the dowel pin 15 and socket 16 being located near the lower side of the blocks 3 and 11. The pin is arranged in a passage 17 in the block 3, the passage opening through the front and rear faces of the block 3 and being tapered, and the pin 15 being also tapered and inserted in the passage 17 from the front end thereof.

Figures 5, 6, 7, 8, 9:
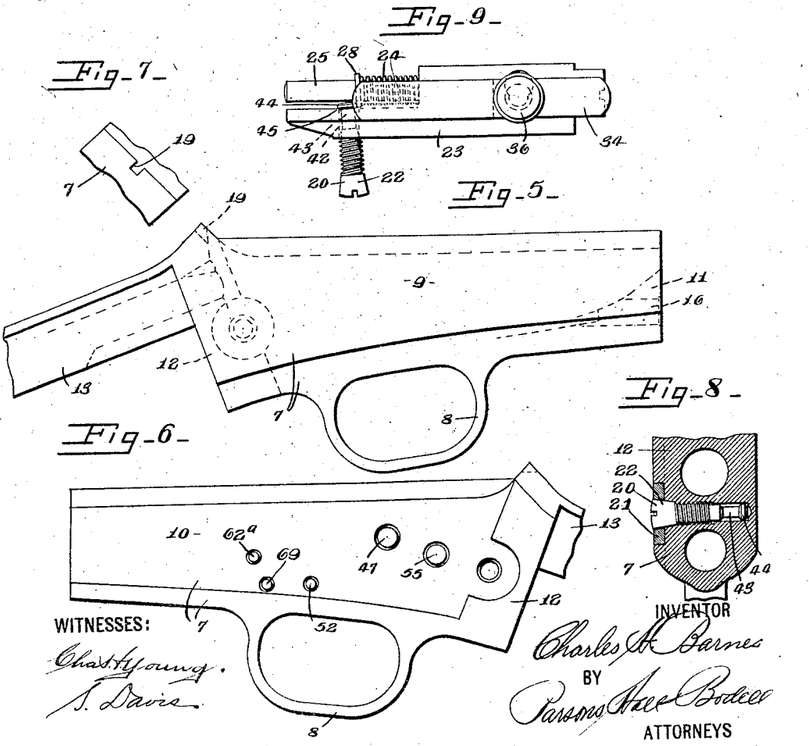
Figs. 5 and 6 are opposite side elevations of the frame.
Fig. 7 is a fragmentary view illustrating in plan, a portion of the frame.
Fig. 8 is a fragmentary sectional view on a reduced scale, on the plane of line "A—A", Fig. 1, parts being removed.
Fig. 9 is a side elevation of the breech bolt and cover plate, illustrating the operation of the tool used in removing the breech bolt from the receiver.

The interfitting means at the rear end of the receiver 1 and frame 7 includes a tongue 18 extending rearwardly from the top of the receiver 1 and fitting into a groove 19, Fig. 7, in the upper side of the block 12 of the frame. The single screw 20 for securing the receiver and frame together extends transversely through an ear 21 extending rearwardly from the rear edge of the side plate 2 of the receiver 1 and into the rear block 12 of the frame 7, Fig. 8, the ear 21 being sunk in the side face of the block 12. The screw 20 threads only in the block 12 and in order that the receiver 1 and frame 7 will be absolutely tight, the screw 20 is formed with an elongated conical head 22 which fits the conical walls of the screw holes in the ear 21 and block 12. Hence any looseness due to the threads of the screw and screw hole is taken up by the conical head 22.

23 is the breech bolt here shown as slidable in the upper portion of the receiver for opening and closing the breech of the gun, the firearm being here shown as automatic so that the breech bolt is thrown rearwardly by the explosion of the cartridge, the rearward movement of the breech bolt being against the action of a spring 24 encircling the firing pin 25 extending lengthwise of the breech bolt, this pin 25 extending through an opening in a vertical wall 26 which forms an abutment for the spring 24 and against which a washer 28 on the pin 25 is held by the spring 24, Figs. 1, 2, 10 and 17. The rear end of the pin 25 is exposed to the hammer of the firearm. The breech bolt 23 slides between opposite side walls 2 and 9 of the receiver 1 and frame 7 respectively, and is provided with engaging parts or runners 29, 30, Fig. 16, the runner 29 resting in a suitable upwardly facing guide 31 formed in the inner side face of the outer side wall 9 of the frame 7, and the other runner 30 resting on the upper edge of the inner side plate 10 of the frame 7. The side plate 2 of the receiver 1 is also provided with an inwardly extending lug 32 which engages the upper face of the runner 30. The flange 4 is provided with a similar lug 33, Fig. 17, engaging the upper face of the runner 29.

Figure 10:
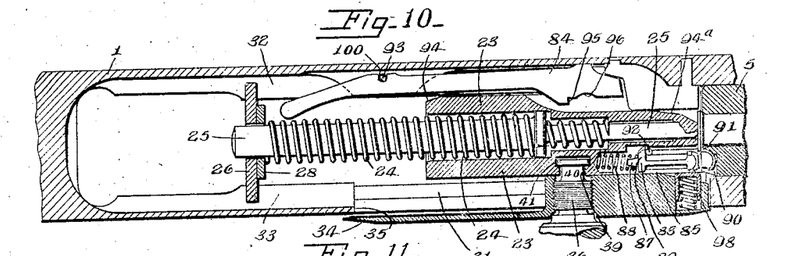
Figs. 10, 11, 12 and 13 are horizontal longitudinal sectional views taken on the plane of line "B—B", Fig. 1, illustrating the operation of the extracting and ejecting means, parts being shown in elevation and parts being omitted.
Figures 15, 16, 17:
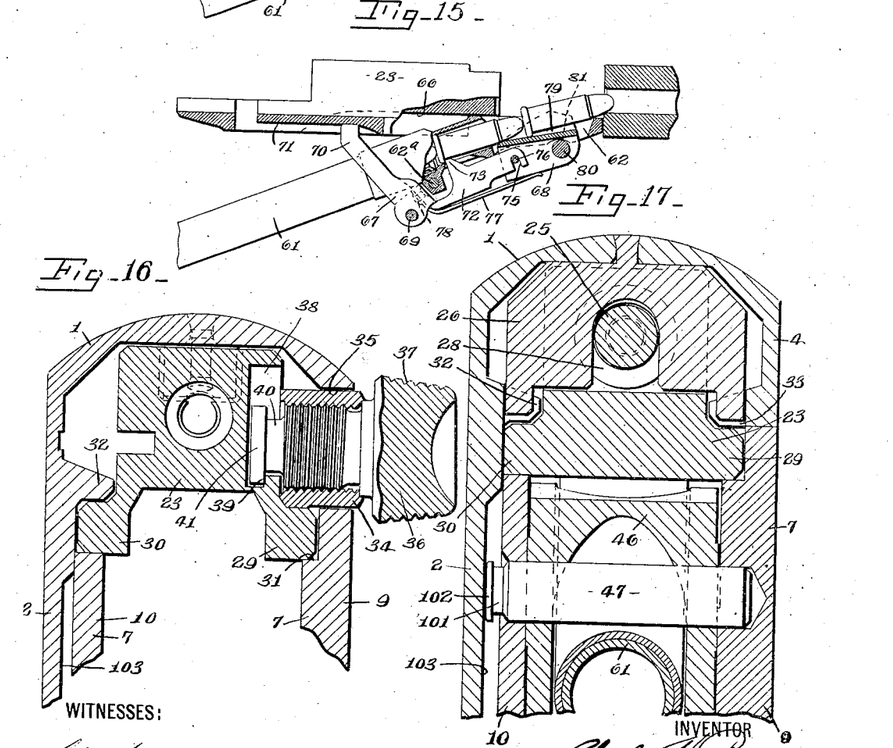
Fig. 16 is an enlarged sectional view, parts being omitted, on the plane of line "C—C", Fig. 1.
Fig. 17 is an enlarged sectional view on line "D—D", Fig. 2, parts being omitted.
Figure 18:
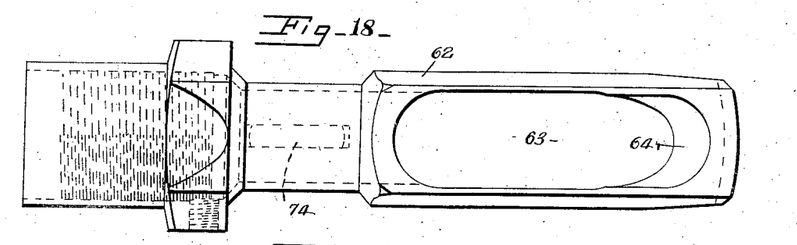
Fig. 18 is an enlarged plan of the extension of the magazine tube.

34, Figs. 9, 10 and 16, is the cover plate for the shell exit slot 35, Fig. 3. The slot 35 is formed in the flange 4 and opens through the lower edge thereof, Fig. 3. The body portion of the cover plate 34 slides in the slot 35 and a portion thereof overlies the outer face of the receiver, and said cover plate is connected to the breech bolt 23 by means of a clamping member as a screw 36, Figs. 9 and 16, threading through the portion of the cover plate working in the slot 35, the screw 36 having means at its inner end which interlocks with the breech bolt, and a knurled head 37 at its outer end.

In the illustrated embodiment of my invention, the breech bolt is formed with a recess or slot 38, Fig. 2, in the side thereof contiguous to the cover plate, this recess having an enlarged entrance at its upper end and a contracted portion 39 at its lower end, the walls of the contracted portion being undercut, Figs. 10, 11, 12 and 13, and the inner end of the screw is formed with a circumferential groove which forms a shank 40 of reduced diameter and an enlarged head 41.

In assembling the breech bolt and the cover plate, the screw 36 is placed so that the head 41 may enter the enlarged entrance of the recess 38 and the head then moved downwardly into the contracted portion 39 of the recess under the undercut sides. The head 41 loosely fits the contracted portion 39 of the recess and is clamped in position by screwing outwardly on the screw 36.

In placing the breech bolt 23 and cover plate 34 attached thereto in the receiver, a tool, as shown in Figs. 3 and 9, is placed through a suitable opening 42 in the breech bolt, and engaged with the washer 28 to hold the firing pin spring 24 contracted sufficiently so that the washer 28 can be placed in engagement with the wall 26. The reverse of this operation takes place to remove the breech bolt. After the breech bolt is placed in position the receiver 1 and frame 7 are joined together. Preferably in order that a tool will always be available when it is necessary to remove the breech bolt, the screw 20 for holding the receiver 1 and frame 9 together is formed with a reduced unthreaded extension 43 having a head 44 at its end for engaging the washer 28 and hooking over the surface at the inner end of the work passage 42 as shown at 45, Fig. 9, and hence preventing unintentional displacement of the screw.

46 is the hammer pivoted at 47 to the frame and actuated through a rod 48 which is connected to a suitable spring-pressed plunger 49 movable in a passage 50 in the stock or butt 14, the plunger 49 being pressed inwardly by a suitable spring, not shown, in any well known manner.

51 is the trigger pivoted at 52 to the sides 9, 10 of the frame and having a tooth 53 rigid therewith which coacts with a notch 54 in the hammer 46 to hold the hammer cocked.

A stop pin 55, Figs. 1 and 2, is provided between the side walls 9, 10 of the frame, the pin 55 being located to prevent overthrow of the hammer, if the trigger should be pulled when frame 7 and receiver 1 are detached.

56 is a safety sear pivoted on the pivot 52 of the trigger and coacting with a second notch 57 in the hammer and being pressed upwardly into operative position by a spring-pressed plunger 58 carried by the trigger, the safety sear operating to prevent doubling, or repeated firing, upon one pull of the trigger.

The portion of the hammer 46 below its pivot 47 is bifurcated in order to straddle the magazine tube, and the upper portion of the trigger within the receiver is also bifurcated for the same purpose, and the safety sear 56 is carried between the bifurcations below the magazine tube.

59 is a safety pivoted within the frame on a vertical pivot 60 and movable laterally on its pivot into and out of position to hold the trigger with its tooth 53 engaged with the notch 54 and hence prevent pivotal movement of the trigger when the hammer is cocked.

The hammer mechanism, trigger mechanism, safety sear and safety, form no part of this invention and further description is deemed unnecessary.

61, Figs. 1, 2, 14 and 15 is the magazine tube arranged lengthwise of the stock or butt 14 and extending into the receiver through the block 12 at the rear end of the frame in a direction inclined relatively to the breech bolt or direction of movement of the breech bolt.

The upper end of the magazine tube 61 is preferably equipped with an extension 62, which preferably includes an internally threaded head for receiving the upper end of the tube 61, a neck of relatively reduced diameter forming an internal shoulder which arrests the upward movement of the magazine follower when the magazine is empty, and is provided in its lower surface with a slot 74, and a body having a slot 63 extending vertically therethrough and provided at its front end with an inclined wall 64. The spring-pressed follower 65 tends to force the cartridges lengthwise of the tube 61 and hence forces the forward end of the foremost cartridge against the inclined wall 64 for directing this end of the cartridge toward the rear end of the firing chamber when the breech block is retracted.

Figure 14:
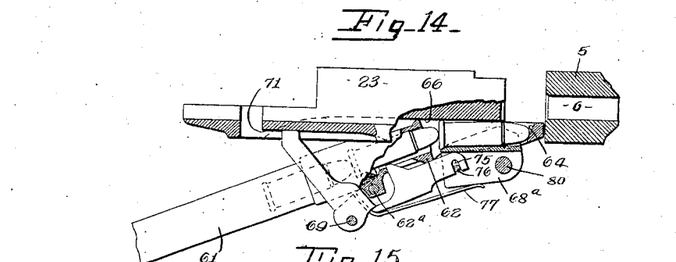
Figs. 14 and 15 are fragmentary views, on a reduced scale, of parts of the mechanism shown in Figs. 1 and 2, illustrating different positions occupied by the cartridge carrier and the breech bolt during the operation thereof.

67 and 68, Figs. 1, 2, 14, 15, 19, 20, 21, 22 and 23, are elements of the cartridge carrier, the element 67 being the main element and being pivoted at 69 in the frame between the sides 9, 10 and below the magazine tube 61 and having a rearwardly and upwardly extending arm 70 which coacts with a cam surface 71 on the breech bolt 23, whereby the cartridge carrier is actuated by the breech bolt. Said main element 67 is formed in front of its pivot 69 with an arm 72 having a cartridge stop 73 arranged to extend through the slot 74 into the path of the rim of the second cartridge, to prevent feeding thereof into the space in front of the breech bolt 23 when the breech bolt is in its rear position, while the first cartridge is being fed thereto, as seen in Fig. 14.

The cartridge stop 73 is normally out of operative position, as seen in Fig. 1, but during the initial part of the rearward movement of the breech bolt 23, it moves into operative position, as seen in Fig. 14, and remains in such position while the foremost cartridge is being fed into the firing chamber as seen in Fig. 15. When the breech bolt 23 returns to its closed position, the rocking element 67 returns to its normal position, shown in Fig. 1, and permits the cartridge to feed until the foremost cartridge is in the slot 63 of the extension 62 and abuts against the inclined face 64 at the front end of the slot 63.

An element 68 is bodily movable in reference to the element 67 and adjacent its rear end it is connected to the forward portion of the arm 72 by a pin and slot connection. As here shown the slot 75 is provided in the arm 72 and opens through the lower edge of this arm, and the pin 76 is carried by the element 68. A spring blade 77 fixedly connected at one end 78 to the element 67 and bears at its free end upon the lower edge of the element 68 and tends to hold the latter from movement independently of the element 67 and the arm 72 thereof. The element 68 has a portion thereof extending into the slot 63 and movable therethrough for forcing the cartridge supported thereby into the path of the breech bolt when the latter is retracted.

As seen in Figs. 14, 15, 21, 22 and 23, the element 68 is formed with a cradle portion 79 for receiving the foremost cartridge, and is provided with laterally extending shoulders or trunnions 80 near its front end and below the cradle portion, these shoulders or trunnions 80 being designed to engage bearings 81 on the lower side faces of the extension 62 on opposite sides of the slot 63 and near the front end thereof, in order to cause the element 68 to tilt about said shoulders 80 as a center, and raise the rear end of the cartridge into the path of the breech bolt 23, the pin and slot 75, 76 permitting this tilting movement relatively to the main element 67.

The element 68 is movable bodily in reference to the element 67 and arm 72 thereof for the purpose of accommodating a cartridge between said cradle portion 79 and the breech block, when the latter is in its forward position, as shown in Fig. 14 and it may be said that the breech block controls the independent movement of the element 68.

Figures 19, 20:
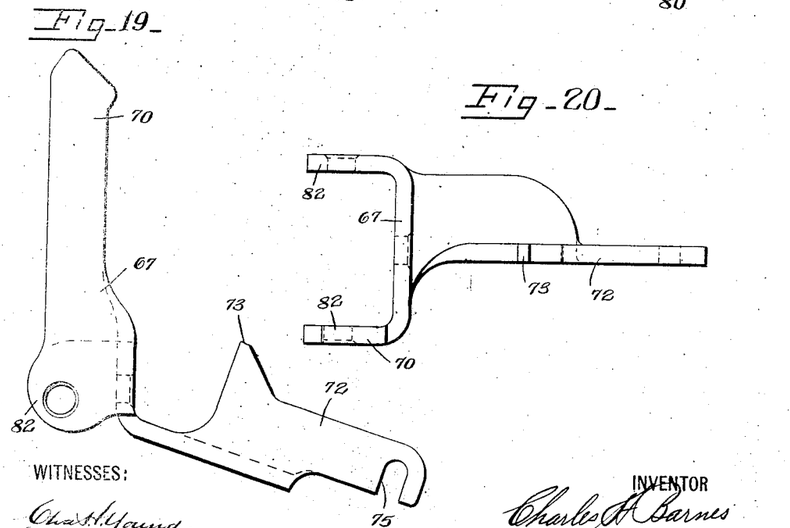
Figs. 19 and 20 are respectively, an enlarged side elevation and a plan view of the main element of the cartridge carrier,
Figure 21:
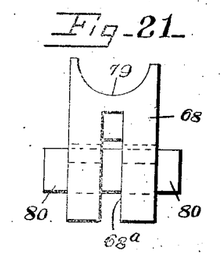
Figs. 21, 22 and 23 are respectively, an enlarged end elevation, a side elevation and a plan view of the other or cradle element of the cartridge carrier.
Figure 22:
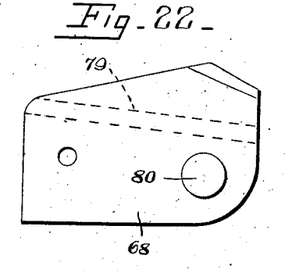
Figure 23:
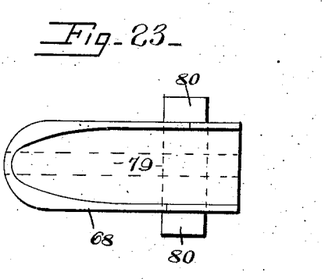

The main element 67, as seen in Figs. 19, 20, is formed from a sheet metal blank, the blank being formed to have opposing bearing lugs 82 for the pivot 69, the arm 70 projecting from one of said lugs, and the arm 72 projecting from between the lugs 82 and being located centrally of said lugs 82. Said arm 72 is formed with the slot 75 forming part of said pin and slot connection, the pin 76 of which is located between and held in position by the sides of the element 68. The arm 72 extends in a centrally located slot 68ª, Fig. 21, in the element 68 below the cradle 79 thereof.

In operation, as the breech bolt 23 is thrown rearwardly, the cam 71 thereof rocks the element 67 as described, and the spring blade 77 carries the element 68 from the position shown in Fig. 1, to that shown in Fig. 14, the pin 76 moving in its slot 75 as shown. The inclined surface 64 of the extension 62 of the magazine tube 61 and the raising of the element 68 tends to force the bullet end of the cartridge upwardly. When the breech bolt 23 approaches the limit of its rearward movement as shown in Fig. 15, the bullet end of the cartridge moves upwardly and toward the entrance of the firing chamber 6, due to the feeding of the cartridges by the spring-pressed follower 65 in the magazine tube 61; and the trunnions 80 engage their bearings 81 on the lower side of the extension 62 of the magazine tube 61, so that under the pressure of the spring 77 due to the rocking of the element 67 by the breech bolt 23, the cradle element 68 moves about the trunnions 80 as a center, and raises the rear end thereof into the position shown in Fig. 15, and hence lifts the rear end of the cartridge into the path of the breech bolt 23. While the rear end of the foremost cartridge is being lifted, the cartridge is also being fed forward and the second cartridge fed into the position shown in Fig. 15 from that shown in Fig. 14 and is limited in its feeding by the stop 73 as heretofore described.

Referring particularly to Figs. 10, 11, 12 and 13. 83 is an extractor, and 84 is an ejector located on opposite sides of the breech bolt, the extractor 83 being carried by, and movable with, the breech bolt 23 on the side thereof contiguous to the cover 34 of the receiver which is formed with the shell exit slot 35, and the ejector 84 being carried by the receiver. The extractor 83 is here shown as carried in a recess 85 opening through the side and the front end faces of the breech bolt 23, and said extractor is held in position by the cover plate 34 for the exit slot 35 and is mounted to be moved laterally toward said cover plate 34 by the ejector 84 through the medium of the interposed shell 86. As here shown, the extractor is elongated and is formed with a tail 87 and is normally pressed toward its normal position, that is, that shown in Fig. 10, by a returning spring 88 located in a socket at the rear end of the recess 85, the spring acting against an enlargement or shoulder 89 near the rear end of such extractor.

The extractor 83 at its forward end normally projects beyond the front end of the breech bolt 23 into a recess 90 in the rear end of the barrel and is formed with a shoulder 91 for engaging the front side of the rim of the cartridge shell 86. The movement of the extractor by its spring 88 is limited by a stop shoulder 92 which also causes the extractor to have a pivotal movement laterally. The spring 88 permits the extractor 83 to ratchet into engagement with the rim of the cartridge in the firing chamber as seen in Fig. 10.

The ejector 84 is pivoted between its ends at 93 to the receiver and the rear end thereof coacts with a cam 94 on the side face of the breech bolt 23, and the forward end is arranged to project into the space in front of the breech bolt when in its rear position. Said forward end is provided with a shoulder 95 arranged to engage the rear face of the rim of the shell at a point diametrically opposite that engaged by the head or shoulder 91 of the extractor, and is formed with a concave cutout 96 in advance of the shoulder 95. The head 91 of the extractor is also formed with a convex rounding face 97 for acting in conjunction with said concave cutout 96 of the ejector to give a twirling motion to the shell being ejected and to effect the ratcheting of the head 91 into engagement with the rim of the cartridge.

The impulse for the twirling motion is effected by spring means acting to resist lateral movement of the extractor 83 by the ejector 84 through the medium of the interposed shell after such extractor has been moved laterally a predetermined distance. As here shown this means comprises a spring pressed plunger 98 carried in a recess opening in the inner face of the cover plate 34 and arranged to engage the advance end of the extractor 83. The recess 85 for the extractor 83 is of less width than the recess for the plunger 98 and hence when the breech bolt 23 and cover plate 34 are assembled, the spring-pressed plunger is held from projecting beyond the inner face of the cover plate 34 by the portions of the breech bolt on opposite sides of the recess 85.

In order that the ejector 84 may be removed upon the removal of the breech bolt and may also be readily replaced in position, the ejector is formed with an open ended slot 100 for receiving the pivot pin 93 fixed within the receiver.

Figure 11:
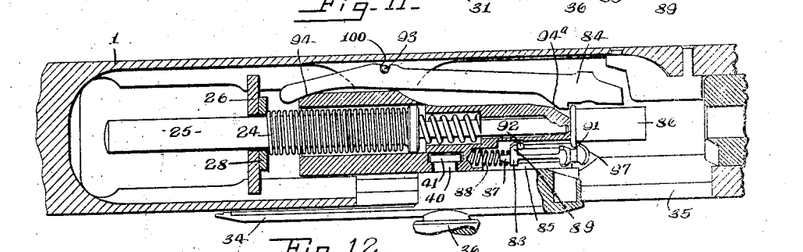
Figure 12:
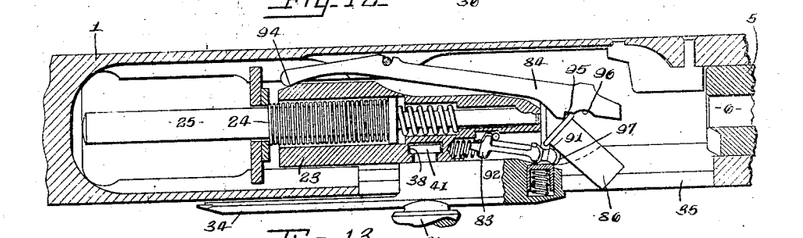
Figure 13:
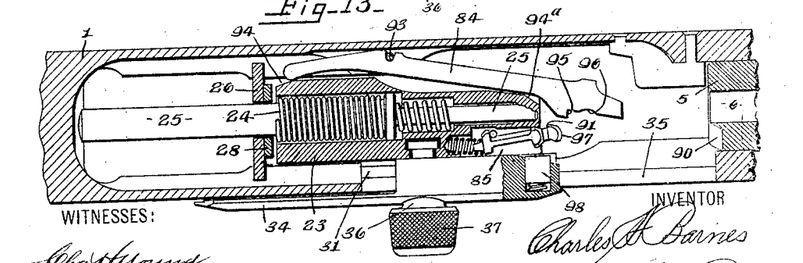

In operation, as the breech bolt 23 moves rearwardly, the extractor 83 withdraws the shell from the firing chamber 6 from the position shown in Fig. 10 to that shown in Fig. 11. The cam 94 of the breech then engages the rear arm of the ejector causing the ejector to move about its pivot 93 into the position shown in Fig. 11, moving the shoulder 95 thereof in the rear of the rim of the cartridge shell 86. During continued movement of the breech bolt the cam 94 further tilts the ejector on its pivot into the position shown in Fig. 12, the shoulder 95 forces one side of the shell outwardly, while the other side thereof is being held by the head 91 of the extractor 83. During this forcing movement of the ejector 84 the extractor 83 is moved laterally first against the slight resisting action of its spring 88 and subsequently comes into engagement with the spring-pressed plunger 98 depressing such plunger. This tilting movement of the shell moves the portion of the rim thereof engaged with the shoulder 95 toward the concave cutout 96 and when it reaches such cutout, the spring-pressed plunger 98 which has been put under tension, reacts and flips the shell with a whirling movement through the exit slot 35 leaving the parts in the position shown in Fig. 13. During the forward movement of the breech bolt 23 under the action of its spring, the ejector 84 is returned to its position by a cam 94ª on the breech bolt 23, and the head 91 of the extractor snaps into engagement with the rim of the fresh cartridge fed in front of the breech bolt as previously described.

In order to permit the ready removal of the parts of the mechanism in the frame between the sides 9, 10 thereof, the holes for pivots or pins 47, 52, 55, 62ª and 69, pass entirely through the side 10 and but part way into the side 9, and the pivots and pins slide into their bearings and are held in position when the receiver and frame are assembled by the side plate 2 of the receiver. Each pin, as illustrated in Fig. 17, is formed with a circumferential groove as 101 forming a head 102 by which the pin can be engaged to be withdrawn when the receiver and frame are separated. For the purpose of providing space or clearance for the heads 102, the side plate 2 of the receiver is recessed at 103 as shown in Figs. 3, 16 and 17.

My firearm is particularly advantageous in that it is simple in construction and economical in manufacture, and in that the mechanism thereof can be quickly removed and replaced.

What I claim is:

1. In a firearm and in combination, a barrel having a firing chamber in its rear end, a shiftable breech bolt, a magazine for holding a plurality of cartridges substantially in axial alinement, a spring-pressed follower tending to force the cartridges endwise toward the firing chamber, a rocking detent for engaging the cartridge next to that about to be fed into alinement with the firing chamber, said detent being out of engaging position when the breech block is closed, an arm associated with the detent, and means on the breech bolt coöperating with the arm for moving the detent into engaging position, substantially as and for the purpose described.

2. In a firearm, a receiver, and mechanism in the receiver including a movable breech bolt, a cartridge magazine arranged to feed the cartridges in front of the breech bolt when in its rear position, and a rocking element pivoted between its ends and having a cartridge stop in front of its pivot, and an upwardly and rearwardly extending arm coacting with the breech bolt whereby said element is rocked on its pivot by the breech bolt, into position to engage the stop with a cartridge in the magazine, substantially as and for the purpose specified.

3. In a firearm, a receiver, and mechanism in the receiver including a movable breech bolt, a cartridge magazine tube inclined relatively to the breech bolt, the magazine tube having an extension terminating under the space in front of the breech bolt when in its rear position, said extension having a slot opening into such space, the slot being of sufficient length to permit the cartridge to be fed sidewise into said space and a member extending through and movable in the slot for supporting and feeding a cartridge in advance of the breech bolt, substantially as and for the purpose described.

4. In a firearm, a receiver, and mechanism in the receiver including a movable breech bolt, a cartridge magazine tube inclined relatively to the breech bolt and having an extension under the space in front of the breech bolt when in its rear position, the extension having a slot extending through its upper and lower faces and alined with said space, and means working through said slot for forcing the cartridge into such space into the path of the breech bolt, substantially, as and for the purpose specified.

5. In a firearm, a receiver, and mechanism in the receiver including a breech bolt, a magazine tube inclined relatively to the breech bolt, and an extension secured to the forward end thereof, said extension comprising a head for receiving the end of the tube, a neck, and a body having a slot extending vertically therethrough and provided with an inclined front wall, substantially as and for the purpose specified.

6. In a firearm, a receiver, and mechanism in the receiver including a breech bolt, a magazine tube inclined forwardly to the breech bolt, an extension secured to the forward end thereof and comprising a head for receiving the end of the tube, a neck having a slot therein and a body having a slot extending vertically therethrough and provided with an inclined front wall, a detent having a member operating through the slot in the neck, and a cartridge supporting and feeding element having a part extending through the slot in said body, substantially as and for the purpose set forth.

7. In a firearm, a receiver, and mechanism in the receiver including a breech bolt, a magazine tube inclined downwardly and rearwardly, a spring-pressed follower therein, an extension secured to the forward end of the tube and including a head for receiving the end of the tube, a neck providing an internal shoulder and having a slot in the under side thereof, and a body having a vertically disposed slot extending therethrough, a pivotally mounted element having a part operating through the slot in the neck and providing a detent, said element having a part coacting with the breech bolt, and a cartridge supporting and feeding element operating in the slot in the body and actuated by the first-named element, substantially as and for the purpose described.

8. In a firearm, a receiver, and mechanism in the receiver including a breech bolt, a magazine tube inclined downwardly and rearwardly in reference to the breech bolt, an extension at the upper end of said tube, said extension comprising a head for receiving the end of the tube, a neck having a slot in the under side thereof, and a body having a slot therethrough and provided with an inclined front wall, a pin extending through the extension for supporting the same and the upper end of the tube, a pivoted element having a part coöperating with the breech bolt and another part movable through the slot in the neck for providing a cartridge detent, and a second element having a part extending through the slot in the body and providing a cartridge support and feeding device, the second element being operated by the first-named element, substantially as and for the purpose specified.

9. In a firearm, a receiver, and mechanism in the receiver including a breech bolt, a magazine tube inclined relatively to the breech bolt and having an extension terminating beneath the space in front of the breech bolt when in its rear position, the extension having a slot at its front end opening into such space, and an inclined surface at the front end of the slot arranged to engage the bullet end of the cartridge and deflect the front end of the cartridge upwardly into such space, and means working through the slot from the lower side thereof for lifting the rear end of the cartridge into said space and into the path of the breech bolt, substantially as and for the purpose set forth.

10. In a firearm, a receiver, and mechanism in the receiver including a movable breech bolt, a cartridge magazine tube inclined relatively to the breech bolt and having an extension terminating beneath the space in front of the breech bolt when in its rear position, the extension having a slot extending through its upper and lower faces and communicating with said space and an inclined surface at the front end of the slot arranged to deflect the bullet end of the cartridge upwardly into said space, and means operated by the breech bolt and working through the slot from the lower side thereof for lifting the rear end of the cartridge into said space and into the path of the breech bolt, substantially as and for the purpose described.

11. In a firearm, a receiver, a mechanism in the receiver including a movable breech bolt, a cartridge magazine, and a cartridge carrier for transferring the cartridges from the magazine into the space in front of the breech-bolt when the breech-bolt is in its rear position, the carrier including two elements, one a main element pivoted in the receiver and having means coacting with the breech-bolt to be moved on its pivot thereby, and the other being carried by the main element and having a sliding movement in reference thereto, and yielding means tending to hold the second element against movement independent of the main element.

12. In a firearm, a receiver, and mechanism in the receiver including a movable breech bolt, a cartridge magazine, and a cartridge carrier for transferring the cartridges from the magazine into the space in front of the breech bolt when in its rear position, the carrier including a supporting element and a cartridge carrying element movably carried by the supporting element, the cartridge carrying element having a pivot at its front end for engaging a fixed point in the receiver during movement of said elements, and spring means associated with the supporting element and coacting with the cartridge carrying element between the front and rear ends thereof, whereby movement of the supporting element is permitted when movement of the cartridge carrying element on its pivot is delayed, substantially as and for the purpose set forth.

13. In a firearm, a receiver, and mechanism in the receiver including a movable breech bolt, a cartridge magazine, and a cartridge carrier for transferring the cartridges from the magazine into the space in front of the breech bolt when in its rear position, the carrier including two elements, one being carried by and movable relatively to the other, and a spring fixed to the latter element and acting on the former, substantially as and for the purpose set forth.

14. In a firearm, a receiver, and mechanism in the receiver including a movable breech bolt, a cartridge magazine extending downwardly and rearwardly, and a cartridge carrier located contiguous the front end of the magazine and including two elements, one a main element pivoted relatively to the receiver and having means coacting with the breech bolt to be moved on its pivot thereby, and the other being carried by and having a sliding and pivotal connection relatively to the main element and the breech bolt, said other element being arranged to engage the foremost cartridge and carry the same into the space in front of the breech bolt when in its rear position, and a spring carried by one of said elements and pressing against the other and acting to permit relative movement of the element engaging the cartridge and for yieldingly holding the elements in their normal relative positions, substantially as and for the purpose described.

15. In a firearm, a receiver, and mechanism in the receiver including a movable breech bolt, a cartridge magazine, and a cartridge carrier, the carrier including two elements, one a main element supported within the receiver and having means coacting with the breech bolt to be actuated thereby, and the other being connected to the main element by a pin and slot and being carried thereby and arranged to engage the foremost cartridge and transfer the same into the space in front of the breech bolt when in its rear position, means for yieldingly transmitting the movement of the main element to the element carrying the cartridge, and means arranged in the path of the last-mentioned element for engaging and causing the same to tilt against the action of the yielding means, substantially as and for the purpose specified.

16. In a firearm, a receiver, and mechanism in the receiver including a movable breech bolt, a cartridge magazine tube inclined relatively to the breech bolt and having an extension terminating under the space in front of the breech bolt when in its rear position, the magazine tube having a slot extending through its upper and lower faces and alined with said space, and a cartridge carrier including two elements, one a main element pivoted relatively to the receiver and having means for coacting with the breech bolt whereby said element is actuated on its pivot, and the other element arranged to work through said slot to press the cartridge sidewise into said space, said latter element having a shoulder for engaging the extension and causing such element to move about the axis of such shoulder as a fulcrum relatively to the main element, and a spring for resisting the relative pivotal movement of the elements, substantially as and for the purpose set forth.

17. In a firearm, a receiver and mechanism in the receiver including a movable breech bolt, a cartridge magazine inclined relatively to the breech bolt and having an extension beneath the space in front of the breech bolt when in its rear positon, the extension having a slot at its front end opening into said space, and an inclined surface at the front end of the slot arranged to engage the bullet end of the cartridge and deflect said end upwardly into such space, and a cartridge carrier including two elements, one a main element pivotally supported within the receiver and having means coacting with the breech bolt whereby said main element is actuated, and the other element being connected near its rear end to the main element by a pin-and-slot connection, and arranged to lift the foremost cartridge into said space, the main element having a shoulder near its front end for engaging the lower side of the magazine tube, and a spring fixed to the main element and engaging the other, and acting to yieldingly support said latter element, substantially as and for the purpose described.

18. In a firearm, and in combination, a breach bolt, a magazine, and a cartridge carrier for shifting the cartridges received from the magazine into a position in advance of the breech bolt when the same is retracted, said carrier comprising two elements, one of said elements directly engaging the cartridge and having a pivotal and a bodily shiftable movement in respect to the other, substantially as and for the purpose described.

19. In a firearm, and in combination, a breech bolt, a magazine, and a cartridge carrier for shifting the cartridges received from the magazine into a position in advance of the breech bolt when the same is retracted, said carrier comprising two elements, one of said elements directly engaging the cartridge and having a pivotal and a bodily shiftable movement in respect to the other, said bodily movement being controlled by the breech bolt, substantially as and for the purpose specified.

20. In a firearm and in combination, a breech bolt, a magazine, a cartridge carrier for shifting the cartridges into the path of the breech bolt, when the latter is in retracted position, said carrier comprising two elements, one directly controlled by the breech bolt and carrying the other element, and the second element being movable with the first and being shiftable relatively thereto for accommodating a cartridge between its receiving surface and the breech bolt in the forward position of the latter, substantially as and for the purpose set forth.

21. In a firearm and in combination, a breech bolt, a magazine, a cartridge carrier comprising two elements, one being pivotally mounted and the other having a shiftable connection at its rear end to the first and having means at its opposite end for engaging a fixed part and forming a fulcrum about which the second element turns, substantially as and for the purpose described.

22. In a firearm and in combination, a breech bolt, a magazine, an extension at the front end of the magazine, a cartridge carrier comprising two elements, one of the elements being pivotally mounted and controlled in its movement by the breech bolt, and the other element having a yielding sliding connection at its rear end to the first-named element, and a part adjacent the front end of the second-named element for coacting with said extension for arresting the bodily movement for the second element and causing the rear end thereof to move upwardly during the upward movement of the part of the first element to which the second element is connected, substantially as and for the purpose set forth.

23. In a firearm, a receiver, and mechanism in the receiver including a breech bolt, a cartridge magazine tube, a member at the front end of the tube and having a slot extending through its upper and lower faces and alined with the space in front of the breech bolt when the breech bolt is in its rear position, and a cartridge carrier including an element movable through said slot, said element being movable rectilinearly and also having a pivotal movement and having a shoulder for engaging the lower side of said member and causing the element to have a pivotal movement, and means for actuating said element, substantially as and for the purpose set forth.

24. In a firearm, a receiver, and mechanism in the receiver including a breech bolt, a cartridge magazine tube, a member at the front end of the tube and having a slot extending through its upper and lower faces and alined with the space in front of the breech bolt when the breech bolt is in its rear position, and a cartridge carrier including an element movable through said slot, said element being movable rectilinearly and also pivotally and having a shoulder for engaging the lower side of said member and causing the element to have a pivotal movement, and means for actuating said element including a spring for engaging said element, substantially as and for the purpose described.

25. In a firearm, a receiver, and mechanism in the receiver including a movable breech bolt, a cartridge magazine tube, a member located at the front end of the tube and having a slot extending through its upper and lower faces and alined with the space in front of the breech bolt when in its rear position, said member having an inclined face at the front end of the slot arranged to deflect the bullet end of the cartridge upwardly into such space, and a cartridge carrier including an element movable through said slot and having a rectilinear and pivotal movement, said element being pivoted near its rear end and having a shoulder near its front end for engaging said member and causing said element to have a pivotal movement about said shoulder to lift the rear end of the cartridge into such space into the path of the breech bolt, and means coacting with the breech bolt to operate said element, said means including a spring for yieldingly transmitting the actuating movement of said element, substantially as and for the purpose specified.

26. In a firearm, a receiver, and mechanism in the receiver including a movable breech bolt, a cartridge magazine, and a cartridge carrier, the carrier including two elements, one a main element pivoted between its ends relatively to the receiver and having means in the rear of said pivot for coacting with the breech bolt whereby the main element is actuated on its pivot by the breech bolt, the main element having a cartridge stop in front of its pivot and the other element being carried by the main element and arranged to engage the foremost cartridge and carry the same into the space in front of the breech bolt when the breech bolt is in its rear position, substantially as and for the purpose set forth.

27. In a firearm, a receiver, and mechanism in the receiver including a movable breech bolt, a cartridge magazine tube arranged inclined relatively to the breech bolt and having an extension under the space in front of the breech bolt when in its rear position, a rocking element pivoted relatively to the receiver below the magazine and having a cartridge stop in front of its pivot, and an upwardly and rearwardly extending arm in the rear of its pivot, said arm coacting with the breech bolt whereby said element is rocked on its pivot by the breech bolt to move the stop into and out of engagement with the second cartridge in the magazine tube and its extension, and a second element operated by the rocking element for lifting the foremost cartridge into said space into the path of the breech bolt, substantially as and for the purpose set forth.

In testimony whereof, I have hereunto signed my name in the presence of two attesting witnesses, at Ilion, in the county of Herkimer, in the State of New York, this 23rd day of September, 1912.

CHARLES H. BARNES.

Witnesses:
W. F. LAWRENCE,
JOHNSON MORGAN.